（12） United States Patent
Takechi et al.

(10) Patent No.: US 9,627,727 B2
(45) Date of Patent: Apr. 18, 2017

(54) LITHIUM-AIR BATTERY WITH CATHODE SEPARATED FROM FREE LITHIUM ION

(71) Applicant: Toyota Motor Engineering & Manufacturing North America, Inc., Erlanger, KY (US)

(72) Inventors: Kensuke Takechi, Ann Arbor, MI (US); Fuminori Mizuno, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 262 days.

(21) Appl. No.: 14/337,432

(22) Filed: Jul. 22, 2014

(65) Prior Publication Data
US 2016/0028134 A1     Jan. 28, 2016

(51) Int. Cl.
*H01M 12/08* (2006.01)
*H01M 4/40* (2006.01)
(Continued)

(52) U.S. Cl.
CPC ........... *H01M 12/08* (2013.01); *H01M 4/382* (2013.01); *H01M 4/405* (2013.01); *H01M 12/02* (2013.01); *H01M 2220/20* (2013.01); *H01M 2300/0025* (2013.01); *H01M 2300/0045* (2013.01); *H01M 2300/0071* (2013.01); *H01M 2300/0088* (2013.01); *Y02T 90/32* (2013.01)

(58) Field of Classification Search
None
See application file for complete search history.

(56) References Cited

U.S. PATENT DOCUMENTS 7,390,591 B2 * 6/2008 Visco .................. H01M 2/1673
429/126
2010/0151336 A1    6/2010 Nakanishi et al.
(Continued)

FOREIGN PATENT DOCUMENTS

WO    WO 2008/133642 A2    11/2008
WO    WO 2011/154869 A2    12/2011
(Continued)

OTHER PUBLICATIONS

Kim, Byung Gon et al., "Robust Cyling of Li-O2 Batteries through the Synergistic Effect of Blended Electrolytes," ChemSusChem 6, 443-448, Feb. 1, 2013.*
(Continued)

*Primary Examiner* — Jonathan Crepeau
(74) *Attorney, Agent, or Firm* — Oblon, McClelland, Maier & Neustadt, L.L.P.

(57) ABSTRACT

A lithium-air electrochemical cell is provided. The battery comprises: an anode compartment; a cathode compartment; and a lithium ion conductive membrane separating the anode compartment from the cathode compartment. The anode compartment comprises an anode having lithium or a lithium alloy as active metal and a lithium ion electrolyte, while the cathode compartment comprises an air electrode and an ionic liquid capable of supporting the reduction of oxygen. A lithium ion concentration in the cathode compartment is such that the lithium ion concentration is greatest at the lithium ion selective membrane and lowest at the cathode.

16 Claims, 5 Drawing Sheets

(51) Int. Cl.
*H01M 4/38* (2006.01)
*H01M 12/02* (2006.01)

(56) References Cited

U.S. PATENT DOCUMENTS

| | | | |
|---|---|---|---|
| 2013/0202974 A1* | 8/2013 | Mizuno | H01M 4/86 |
| | | | 429/405 |
| 2013/0230783 A1 | 9/2013 | Amine et al. | |
| 2013/0330641 A1 | 12/2013 | Christensen et al. | |
| 2014/0011101 A1 | 1/2014 | Ma et al. | |
| 2014/0045078 A1 | 2/2014 | Eicher et al. | |
| 2014/0072884 A1 | 3/2014 | Zhang et al. | |
| 2014/0087273 A1 | 3/2014 | Christensen et al. | |

FOREIGN PATENT DOCUMENTS

| | | | |
|---|---|---|---|
| WO | WO 2012/025975 | * | 3/2012 |
| WO | WO 2012/146525 | * | 11/2012 |

OTHER PUBLICATIONS

U.S. Appl. No. 14/446,852, filed Jul. 30, 2014, Takechi et al.

\* cited by examiner

LITHIUM-AIR BATTERY WITH CATHODE SEPARATED FROM FREE LITHIUM ION

BACKGROUND OF THE INVENTION

The present invention is directed to a lithium-air battery having high capacity and recycle efficiency.

Lithium ion technology has dominated the market as energy source for small electronic devices and even hybrid electric vehicles. However, Li-ion batteries have insufficient theoretical capacity to be a power source for future high capacity generations of power sources capable to run an electric vehicle.

Metal-air batteries have been under investigation as an advanced generation of high capacity energy sources that have the potential to power vehicular devices for distances comparable to present hydrocarbon based combustion engines. In a metal-air battery, the metal of the anode is oxidized and the resulting cation travels to the cathode zone containing a porous matrix of a material such as carbon, for example, where oxygen is reduced and the reduction product as oxide or peroxide combines with the metal cation to form the discharge product. Upon charge, this process is ideally reversed. Metal-air batteries are recognized to have potential advantageous properties over metal ion batteries because the cathodic material, oxygen, may be obtained from the environmental air atmosphere and the capacity of the battery would in theory be limited by the anodic metal supply. Thus, oxygen gas would be supplied continuously from outside the battery and battery capacity and voltage would be dependent upon the oxygen reducing properties and chemical nature of the discharge product formed.

Lithium air batteries have the potential to supply 5-10 times greater energy density than conventional lithium ion batteries and have attracted much interest and development attention as a post lithium ion battery technology. For example, a nonaqueous lithium air battery which forms $Li_2O_2$ as discharge product theoretically would provide 3038 Wh/kg in comparison to 600 Wh/kg for a lithium ion battery having a cathodic product of $Li_{0.5}CoO_2$. However, in practice, the metal air technology and specifically current nonaqueous lithium air batteries suffer many technical problems which have prevented achievement of the theoretical capacity.

The capacity of the Li air battery is highly dependent upon the capacity of the cathode matrix to store the $Li_2O_2$ discharge product. $Li_2O_2$ is generally insoluble in conventional nonaqueous solvents employed in metal air batteries. Therefore, upon formation at the cathode matrix the $Li_2O_2$ precipitates and fills the surface porosity of the cathode matrix effectively preventing access to the vacant capacity of the matrix interior region. Moreover, $Li_2O_2$ is an insulator and once the surface of the matrix is coated, oxygen reduction is prevented and discharge terminated, i.e., the capacity of the battery is severely reduced in comparison to the theoretical capacity.

As indicated above, effort to address this problem and to produce an efficient high capacity lithium air battery has received much attention.

Christensen et al. (U.S. 2014/0087273) describes a lithium-air electrochemical cell constructed with a negative electrode, a positive air electrode and a porous reservoir (precipitation zone) spacially arranged between the two electrodes that is in fluid communication with the positive electrode such that discharge product formed during cell discharge is located within and precipitates in the reservoir. Christensen discloses a separator between the negative electrode and the reservoir and lists conventional electrolyte systems. Ionic liquids are not described. Also not described is a structure containing a solid state conductor which separates the system into a negative electrode compartment and a positive electrode compartment.

Zhang et al. (U.S. 2014/0072884) describes a lithium-air battery wherein the air cathode is separated from the lithium anode by a solid polymer electrolyte (SPE) containing a cross-linked polysiloxane membrane. The SPE may be formed directly on the anode, formed on a ceramic separator placed between the anode and air cathode or laminated with a second polymer. The problem Zhang addresses is to provide a less fragile separator that prevents lithium dendrites from growing to the cathode.

Eicher et al. (U.S. 2014/0045078) describes a lithium-air electrochemical cell containing a lithium metal anode and a conventional air cathode. The cell is divided into two compartments by a membrane which is ion specific. The electrolyte solvent of the cathode compartment may be organic or aqueous while a solvent is required for the anode compartment. The electrolyte contains lithium difluorophosphate and a fluorinated solvent. Eicher does not disclose or suggest an ionic liquid as a component of the electrolyte of the cathode compartment and does not disclose or suggest an electrolyte wherein the lithium ion concentration at the cathode is very low.

Samsung Electronics (U.S. 2014/0011101) describes a lithium-air battery having a lithium anode which is coated with a protective electrolyte layer followed by a lithium ion conductive solid electrolyte membrane (SEM). On the cathode side of the SEM is electrolyte and another separator separating the air cathode from the anode. This structure creates an anode compartment and a cathode compartment. However, Samsung does not disclose or suggest a cathode compartment electrolyte containing an ionic liquid and a low concentration of lithium ion near the cathode.

Christensen et al. (U.S. 2013/0330641) describes a lithium-air battery having a lithium anode separated from an air cathode. An electrolyte composition is located both at the cathode and within the separator. The air cathode conatins a lithium insertion material for retaining the lithium peroxide discharge product. The insertion material is coated with a polymer which is permeable to lithium ions but impermeable to the electrolyte. This reference does not disclose a compartment construction wherein the cathode compartment contains an ionic liquid and the concentration of lithium ion near the cathode is low.

Amine et al. (U.S. 2013/0230783) describes a lithium-air battery containing a generally standard construction of a lithium anode, a separator and a air cathode. In order to form nanocrystalline lithium peroxide the ether based electrolyte contains a polyalkylene glycol ether, a lithium salt and a compound which favors formation of lithium peroxide having a low charge overpotential, thus leading to nanocrystalline structure. Amine neither discloses nor suggests a cell of compartment construction wherein the cathode compartment contains an ionic liquid and the concentration of lithium ion near the cathode is low.

Nakanishi (U.S. 2010/0151336) describes a metal air battery (lithium-air battery is exemplified) which is constructed to maintain the volume of electrolyte at a constant value throughout charge and discharge cycles. This is accomplished by having a constant circulation of electrolyte through the cell and/or by actually monitoring the electrolyte level and adding electrolyte when the level is low. Nakanishi also describes admission of an inert gas to the cell to dilute the oxygen concentration. The construction of the Nakanishi cell is of a conventional format with the devices described above added.

Peled et al. (WO 2011/154869) describes a metal-air battery (sodium-air battery exemplified) constructed with an anode containing a molten metal within a porous framework coated with a solid electrolyte interphase film (SEI), an electrolyte system and an air cathode. Ionic liquids are described as electrolyte components. The SEI contains sulfur derivatives, metal salts and optionally polymer. Peled discloses a wide variety of electrolyte mediums including a ceramic membrane and a polymer electrolyte. Conventional high boiling organic solvents are also described. A compartment construction wherein the cathode compartment contains an ionic liquid and the concentration of lithium ion near the cathode is low is not disclosed or suggested.

Gordon et al. (WO 2008/133642) describes a metal-air battery (both lithium-air and sodium-air batteries are exemplified) containing a metal anode, an ion selective membrane and an air cathode. The ion slective membrane is permeable to metal ions but not electrolyte and shields the anode from the aqueous electrolyte of the cathode. The anode compartment formed by the ion-selective membrane may contain a nonaqueous solvent compatible with the metal. The metal oxide salt formed in the cathode compartment is generally soluble in the aqueous electrolyte. Gordon does not disclose or suggest a compartment construction wherein the cathode compartment contains an ionic liquid and the concentration of lithium ion near the cathode is low.

In spite of the significant ongoing effort there remains a need to develop and produce an efficient, safe, cost effective, high capacity lithium air battery useful especially for powering vehicles to distances at least equal to or competitive with current hydrocarbon fuel systems.

SUMMARY OF THE INVENTION

This and other objects are addressed by the present invention, the first embodiment of which includes a lithium-air electrochemical cell, comprising:

an anode compartment comprising an anode comprising lithium, a lithium alloy or a porous material capable of adsorption and release of lithium;

a cathode compartment comprising an air cathode and an ionic liquid; and a lithium ion selective membrane separating the anode and cathode compartments;

wherein the cathode compartment is spacially arranged such that a distance of the cathode from the lithium ion selective membrane is at least 0.1 mm.

In an aspect of the first embodiment, the ionic liquid of the cathode compartment is free of a lithium salt and is stable to electrochemical reduction of $O_2$.

In another aspect of the first embodiment the cathode compartment comprises a lithium ion concentration gradient such that lithium ion concentration is greatest at the lithium ion selective membrane and least at the air cathode.

In another embodiment, the present invention includes a battery comprising the electrochemical cell of the first embodiment.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS OF THE INVENTION

Throughout this description all ranges described include all values and sub-ranges therein, unless otherwise specified. Additionally, the indefinite article "a" or "an" carries the meaning of "one or more" throughout the description, unless otherwise specified. Where a numerical limit or range is stated, the endpoints are included. Also, all values and subranges within a numerical limit or range are specifically included as if explicitly written out. The phrases "selected from the group consisting of," "chosen from," and the like include mixtures of the specified materials. Terms such as "contain(s)" and the like are open terms meaning 'including at least' unless otherwise specifically noted.

Throughout this description, the terms air, oxygen and $O_2$ as cathode material may be used interchangeably unless specifically limited. One of ordinary skill will understand that $O_2$ is the redox active cathode ingredient and whether described as air, oxygen or $O_2$, the meaning is understood. In certain description air or pure $O_2$ may be described as the source of the cathode ingredient and the meaning of the statement will be clearly understood from the gist of the disclosure.

Further, in the following description the compartments of the electrochemical cell formed by the lithium ion selective membrane, also referred to as the solid state Li-ion conductor may be described as "rooms," i.e., cathode room for cathode compartment or anode room for anode compartment.

The terms electrochemical cell and battery may in some instances be employed interchangeably. However, it may also be possible to construct a battery with a plurality of electrochemical cells. The meaning of these terms will be understood within the context of the description which follows.

According to the present invention the term "vehicle" means any power driven device designed for transportation including an automobile, truck van, bus, golf cart and other utility forms of transportation.

The present inventors are conducting a broad and detailed study of post-lithium ion battery technologies seeking to identify and develop new and improved energy supply systems having capacity and voltage suited to specific uses. Metal-gas batteries having high capacity and high working potential are targets of such study and in this ongoing study the inventors have discovered a new and novel lithium air battery which addresses and overcomes many of the problems associated with conventionally known lithium air batteries as described above.

Figure 1:
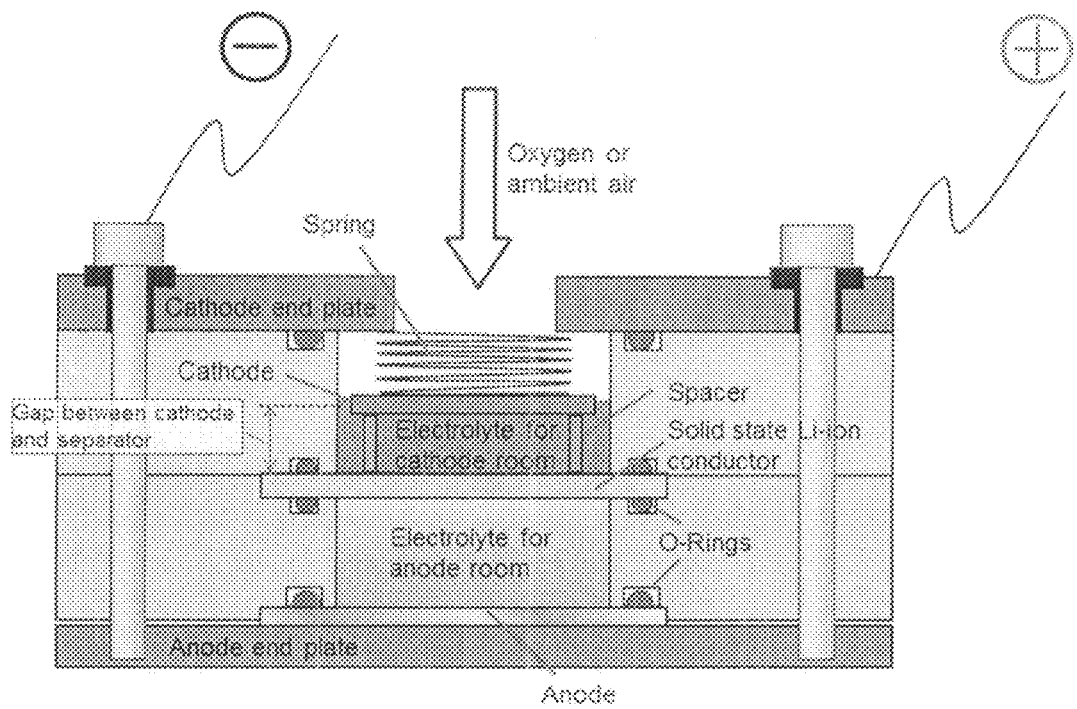
FIG. 1 shows a schematic diagram of a lithium air battery according to one embodiment of the present invention.
Figure 5:
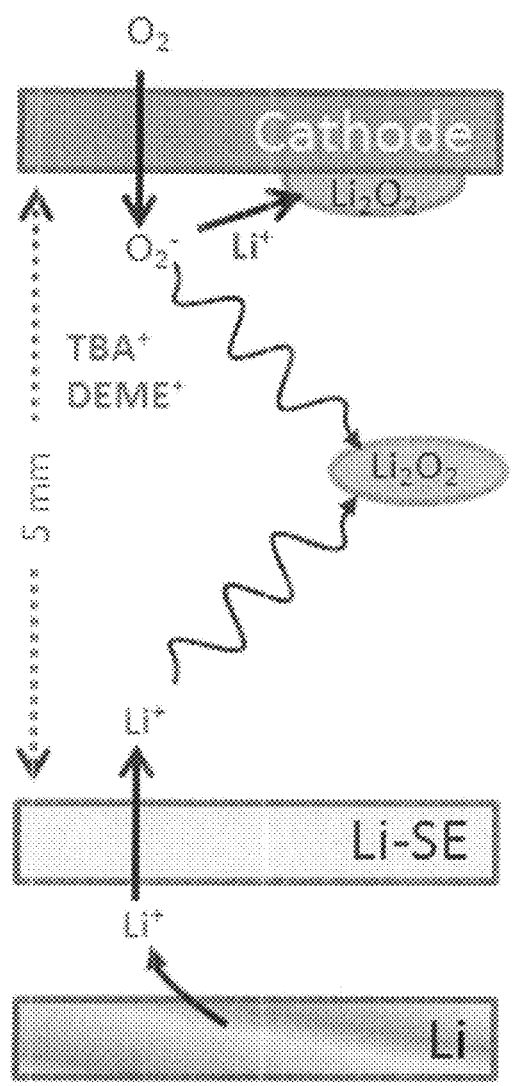
FIG. 5 shows a schematic description of the basic functional structure of a lithium-air battery according to one embodiment of the present invention.

Therefore, the first embodiment of the present invention is a lithium-air battery, comprising: a lithium-air electrochemical cell, comprising: an anode compartment comprising an anode comprising lithium, a lithium alloy or a porous material capable of adsorption and release of lithium; a cathode compartment comprising an air cathode and an ionic liquid; and a lithium ion selective membrane separating the anode and cathode compartments; wherein the cathode compartment is spacially arranged such that a distance of the cathode from the lithium ion selective membrane is at least 0.1 mm. A structural diagram of a lithium-air battery according to an embodiment of the present invention is shown in FIG. 1 wherein spacers are placed between the air cathode and the solid state lithium ion selective membrane (solid state Li-ion conductor) to impart and maintain a set distance gap between the cathode and the lithium ion selective membrane. A further schematic diagram of the cell is shown in FIG. 5 wherein the gap is set to 5 mm.

In one embodiment of the present invention the cathode compartment comprises an ionic liquid, preferably an ionic liquid having a high tolerance of and stability to an $O_2$ radical. The ionic liquids suitable may comprise any of cations such as imidazolium cation, piperidinium cation, pyrrolidinium cation and ammonium cation and any of anions such as bis(trifluoromethansulfonyl)imide anion, bis (fluorosulfonyl)imide anion, tetrafluoroborate anion and hexafluorophosphate anion. In preferred embodiments the ionic liquid may be N-methyl-N-propylpiperidinium bis (trifluoromethansulfonyl)imide (PP13TFSI) or N,N-Diethyl-N-Methyl-N-(2-methoxyethyl)ammonium bis(trefluoromethansulfonyl)imid (DEMETFSI). Moreover, the ionic liquid is selected on a basis that the ionic liquid is capable to reduce $O_2$ electrochenically on the cathode without requirement for the presence of a lithium salt. In one useful embodiment of the present invention, the cation portion of the ionic liquid may be tetrabutyammonium (TBA).

Further, a salt that further enhances the performance of the ionic liquid may be added to the cathode compartment. Such salt must be soluble in the ionic liquid and may serve to stabilize reduced $O_2$ radicals obtained at the cathode without forming solid precipitates which would congest the cathode matrix. Suitable salts that may be added to the cathode compartment include salts of organic cations compatible with an ionic liquid. Examples of such salts include tetraalkyl ammonium salts, imidazolium salts, pyridinium salts and piperidinium salts. According to the concept of the present invention alkali metal salts are not suitable as additive components of the cathode compartment. In one embodiment, an additive salt may be tetrabutyl ammonium (TBA) bis(trifluoromethylsulfonyl) amide (TFSA).

Upon construction of the cell an ionic liquid that is free of lithium salt is placed in the cathode department. During a discharge operation of the cell, lithium ions formed by an oxidative reaction at the anode may pass through the lithium ion selective membrane and enter the cathode compartment. At the same time $O_2$ is reduced to peroxide ion at the cathode and the peroxide ion must migrate from the cathode working surface into the cathode compartment to encounter lithium ions entering the compartment through the selective ion membrane.

In this manner, a concentration gradient of lithium ions is formed such that the concentration is highest near the selective ion membrane and least near the air cathode. Correspondingly, the greatest amount of lithium peroxide ($Li_2O_2$) is formed in the gap away from the cathode surface and does not precipitate onto and cover the surface of the cathode. As the cathode surface remains exposed and not insulated, the oxygen reduction reaction (ORR) may continue. This structure and effect is diagrammed in FIG. 5.

The gap between the selective membrane and the cathode may be sized according to the performance and end-use requirements for the battery. In theory, any gap present would result in the concentration gradient according to the invention. Thus a gap distance between the cathode and selective ion membrane of as little as 0.1 mm may be employed. One of ordinary skill will understand that the greater the gap distance, the greater the opportunity to form a concentration gradient of the discharge products as described. Thus a battery having a gap of 3 mm or more, preferably at least 5 mm may be constructed. Although, in theory, the gap may be as large as 100 mm, size and performance constraints may place a practical upper limit of 20 mm, preferably 15 mm and most preferably 10 mm.

Also, the electrolyte system of the present invention allows for exposure of the cathode to air as an oxygen source because the ionic liquid is not volatile and therefore electrolyte loss during the battery operation is not a problem.

The purpose of the lithium ion conductive membrane is to allow reversible passage of lithium ions (Li+) from the anode compartment to the cathode compartment. The membrane may be constructed of a polymer, a ceramic or a composite thereof. To reduce any detrimental effect of gas on performance of the anode, an effective membrane will be fully impermeable or substantially impermeable to gas, thus preventing gas admitted to the cathode compartment from entrance to the anode compartment. A preferable partition may be a dense ceramic membrane. For example, the partition may be a lithium-ion conducting ceramics plate such as Li—La—Ti—O based perovskite, a Li—Al—Ti—P—O based NASICON, a Li—La—Zr—O based garnet, a Li—P—S based solid electrolyte and a Li—Ge—P—S based solid electrolyte.

The use of solid state conductor also gives a capability of the introduction of the ambient air because it prevents moisture and carbon dioxide coming from the air from approaching the anode to deactivate it.

The metal of the anode may comprise any of lithium, a lithium alloy. or a material capable of intercalation of lithium.

The positive electrode may be of a porous unit construction and may further comprise an oxidation reduction catalyst, a conductive material and a binder. The cathode may be constructed by mixing the redox catalyst, conductive material and optionally the binder and applying the mixture to a current collector of appropriate shape. The oxidation reduction catalyst may be any material which promotes the $O_2$ redox reaction.

Examples of an $O_2$ redox catalyst may include but are not limited to an alkali or alkali earth metal in the form of its oxide ($Li_2O$, $Na_2O$, $K_2O$, MgO, CaO, SrO, BaO), hydroxide (LiOH, NaOH, KOH, $Mg(OH)_2$, $Ca(OH)_2$, $Sr(OH)_2$, $Ba(OH)_2$), carbonate ($Li_2CO_3$, $Na_2CO_3$, $K_2CO_3$, $MgCO_3$, $CaCO_3$, $SrCO_3$, $BaCO_3$), or any combination thereof. The active component is typically impregnated on a high surface area oxide support such as $Al_2O_3$, $ZrO_2$, $TiO_2$, $CeO_2$, or any mixed oxide thereof. A precious metal such as Pt, Pd, Rh, or any combination thereof may be present in the catalyst. The positive electrode may contain an electrically-conductive material which is chemically stable in the potential window of use of the cell.

Preferably the conductive material is porous and has a large specific surface area to provide high output. An example of such material may include but is not limited to a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper. In order to assist diffusion of the air, it may be preferable that the collector is a porous body, such as mesh. In certain embodiments the charge collector may comprise a protective coating of an oxidation-resistant metal or alloy to protect the collector from oxidation.

Due to the presence of the lithium conducting membrane the battery is divided into an anode compartment and a cathode compartment. The lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

Herein the system of the anode compartment may be referenced as the anolyte while the system of the cathode compartment may be referenced as the catholyte. Nonaqueous solvents suitable for the anode compartment include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methylethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethyleneglycol dimethyl ether. In some preferred embodiments the solvent may be a nitrile system solvent such as acetonitrile or an ionic liquid.

An example of a lithium-air electrochemical cell according to the present invention is schematically shown in FIG. 1. In FIG. 1 the lithium ion selective membrane is labeled as solid state Li-ion conductor and the cathode room contains the ionic liquid and the cathode while the anode compartment contains the electrolyte and the lithium anode. The cell is housed in a container which is charged with oxygen or ambient air. The gas enters the cathode compartment through the opening of the cathode end plate.

A battery may also be constructed by combination of a plurality of the electrochemical cells shown in FIG. 1.

Further, the present invention also includes a vehicle that contains a lithium-air electrochemical cell as described above or a battery constructed of a plurality of the lithium-air electrochemical cells.

Having generally described this invention, a further understanding can be obtained by reference to certain specific examples which are provided herein for purposes of illustration only and are not intended to be limiting unless otherwise specified.

EXAMPLES

A lithium-air battery was constructed according to the structure schematically shown in FIG. 1 according to each system described below.

Basic Setup and Condition for Example and Comparative Example Experiments Cathode Carbon paper (TGP-H-120, Toray Industry)

Separator

Solid state Li-ion conductor: 1 mm thick LATP based solid state Li-ion conductor, LIC-GC (OHARA glass)

Electrolyte for Anode Compartment 1.0 mol/L LiTFSA[*1] (Kishida chamical) in propylene carbonate (Kishida chemical)

Anode 0.25 mm of thickness of Li metal (FMC corp.)
Evaluation temp.: 25° C.

Example 1

Electrolyte for cathode compartment: N,N-diethyl-N-methyl-N-(2-methoxyethyl)ammonium cation (DEME)-bis (trifluoromethylsulfonyl) amide anion (TFSA)(Kanto corp.) (no-salt added)
Introduced gas: Pure oxygen (1.2 atm, closed condition)
The gap between cathode and solid state Li-ion conductor: 5 mm Example 2

Electrolyte for cathode compartment: 0.352 mol/kg tetrabutyl ammonium cation (TBA)-TFSA (Kanto corp.) in DEME-TFSA (Kanto corp.)
Introduced gas: Pure oxygen (1.2 atm, closed condition)
The gap between cathode and solid state Li-ion conductor: 5 mm Example 3

Electrolyte for cathode compartment: DEME[*2]-TFSA (no-salt added)
Introduced gas: Ambient air (opened condition)
The gap between cathode and solid state Li-ion conductor: 5 mm Example 4

Electrolyte for cathode compartment: DEME[*2]-TFSA (no-salt added)

Introduced gas: Ambient air (opened condition)
The gap between cathode and solid state Li-ion conductor: 5 mm Comparative Example 1

Electrolyte for cathode compartment: 0.352 mol/kg LiTFSA in DEME-TFSA
Introduced gas: Pure oxygen (1.2 atm, closed condition)
The gap between cathode and solid state Li-ion conductor: 5 mm Comparative Example 2

Electrolyte for cathode compartment: 0.352 mol/kg LiTFSA in DEME-TFSA
Introduced gas: Ambient air (opened condition)
The gap between cathode and solid state Li-ion conductor: 5 mm Comparative Example 3

Figure 2:
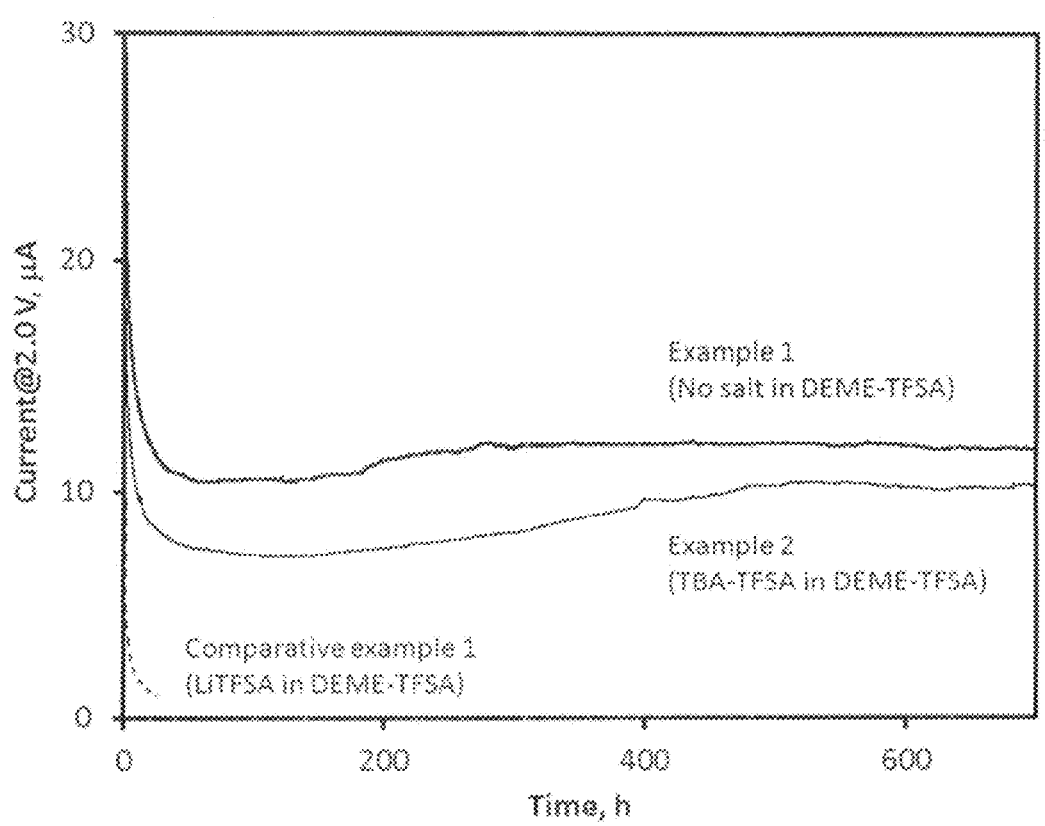
FIG. 2 shows the Discharge curves of Example 1, Example 2 and Comparative example 1 (closed $O_2$ supply).

Electrolyte for cathode compartment: DEME$^{*2}$-TFSA (no-salt added)
Introduced gas: Ambient air (opened condition)
The gap between cathode and solid state Li-ion conductor: 0 mm The Discharge curves obtained for Example 1, Example 2 and Comparative example 1 (closed $O_2$ supply) are shown in FIG. 2. The discharge was run at constant current and constant voltage (CC-CV) mode with 100 mA up to the offset potential of 2.0 V vs. Li and the cut-off current of 5 mA. FIG. 2 shows that Example 1 and Example 2 had significantly larger capacity and rate capability than Comparative example 1 in closed $O_2$ supply condition.

Figure 3:
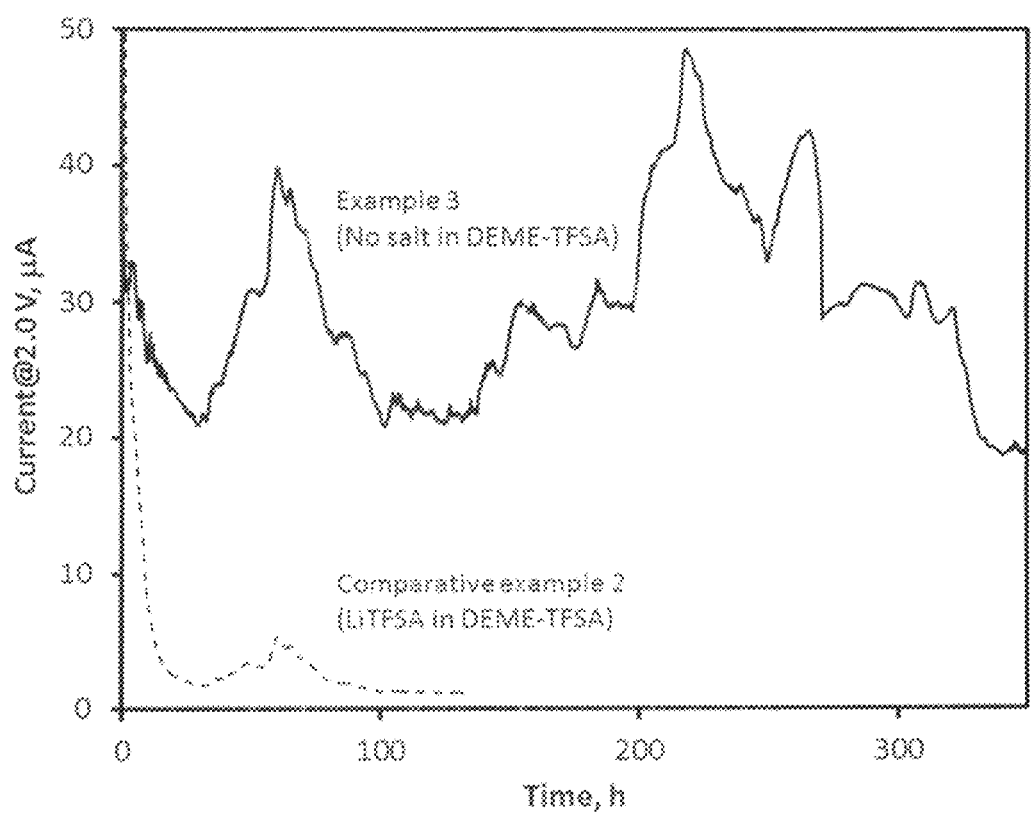
FIG. 3 shows the Discharge curves of Example 3 and Comparative example 2 (opened air supply).

The Discharge curves obtained for Example 3 and Comparative example 2 (opened air supply) are shown in FIG. 3. The discharge was run at constant current and constant voltage (CC-CV) mode with 100 mA up to the offset potential of 2.0 V vs. Li and the cut-off current of 5 mA. FIG. 3 shows that Example 3 had larger capacity and rate capability than Comparative example 2 in opened ambient air supply condition.

Figure 4:
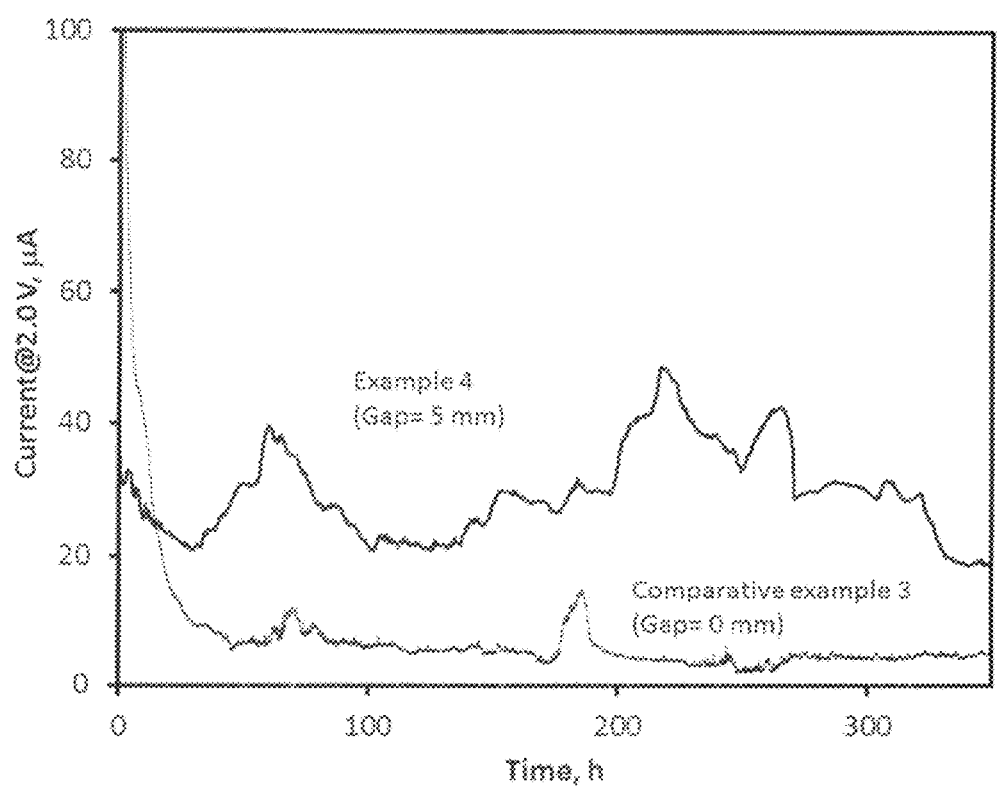
FIG. 4 shows the Discharge curves for Example 4 and Comparative Example 3.

The Discharge curves of Example 4 and Comparative example 3 (opened air supply) are shown in FIG. 4. The discharge was run at constant current and constant voltage (CC-CV) mode with 100 mA up to the offset potential of 2.0 V vs. Li and the cut-off current of 5 mA. FIG. 4 shows clear evidence that Example 4 had higher rate capability than Comparative example 3 in opened ambient air supply condition.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A lithium-air electrochemical cell, comprising:
an anode compartment comprising an anode comprising lithium, a lithium alloy or a porous material capable of adsorption and release of lithium;
a cathode compartment comprising an air cathode, a source of $O_2$ and an ionic liquid; and
a lithium ion selective membrane separating the anode and cathode compartments;
wherein
the cathode compartment is spacially arranged such that a distance of the air cathode from the lithium ion selective membrane is at least 0.1 mm, and
the cathode compartment does not comprise an alkali metal salt as an added component.

2. The lithium-air electrochemical cell of claim 1, wherein the cathode compartment comprises a lithium ion concentration gradient such that lithium ion concentration is greatest at the lithium ion selective membrane and least at the air cathode.

3. The lithium-air electrochemical cell of claim 1, wherein the distance of the cathode from the lithium ion selective membrane is from 0.1 to 20 mm.

4. The lithium-air electrochemical cell of claim 1, wherein the distance of the cathode from the lithium ion selective membrane is from 3 to 20 mm.

5. The lithium air electrochemical cell of claim 1, wherein the ionic liquid is capable of supporting reduction of $O_2$ and is selected from the group consisting of an imidazolium cation, a piperidinium cation, a pyrrolidinium cation or an ammonium cation associated with an anion selected from the group consisting of a bis(trifluoromethansulfonyl)imide anion, a bis(fluorosulfonyl)imide anion, a tetrafluoroborate anion and a hexafluorophosphate anion.

6. The lithium air electrochemical cell of claim 1, wherein the lithium ion conductive membrane separating the anode compartment from the cathode compartment is a polymer, a ceramic or a composite thereof.

7. The lithium air electrochemical cell of claim 6, wherein the membrane comprises a ceramic material and the ceramic material is a ceramic membrane.

8. The lithium air electrochemical cell of claim 7, wherein the dense ceramic membrane comprises one selected from the group consisting of a Li—La—Ti—O based perovskite, a Li—Al—Ti—P—O based NASICON, a Li—La—Zr—O based garnet, a Li—P—S based solid electrolyte and a Li—Ge—P—S based solid electrolyte.

9. The lithium air electrochemical cell of claim 1, wherein the ionic liquid is N,N-diethyl-N-methyl-N-(2-methoxyethyl)ammonium cation (DEME)-bis(trifluoromethylsulfonyl) amide anion (TFSA).

10. The lithium-air electrochemical cell of claim 1, wherein the cathode compartment further comprises a salt soluble in the ionic liquid.

11. The lithium-air electrochemical cell of claim 10, wherein the ionic liquid soluble salt is selected from the group consisting of a tetraalkyl ammonium salt, an imidazolium salt, a pyridinium salt and a piperidinium salt.

12. The lithium-air electrochemical cell of claim 11, wherein the ionic liquid soluble salt is tetrabutyl ammonium bis(trifluoromethylsulfonyl) amide (TBA-TFSA).

13. The lithium-air electrochemical cell of claim 1, wherein the source of $O_2$ is air.

14. A battery comprising the lithium-air electrochemical cell of claim 1.

15. The battery of claim 14, wherein the source of $O_2$ is air.

16. A vehicle comprising the battery of claim 15.

* * * * *